United States Patent [19]
Dieterle et al.

[11] Patent Number: 4,891,707
[45] Date of Patent: Jan. 2, 1990

[54] TELEVISION RECEIVER WITH A CONTROLLED, LINE-SEPARATING, SWITCHED EXTERNAL-POWER SUPPLY

[75] Inventors: Franz Dieterle, St. Georgen; Uwe Hartmann; Udo Mai, both of Villingen-Schwenningen, all of Fed. Rep. of Germany

[73] Assignee: Deutsche Thomson-Brandt GmbH, Villingen, Fed. Rep. of Germany

[21] Appl. No.: 164,100

[22] Filed: Apr. 4, 1988

[30] Foreign Application Priority Data

Mar. 12, 1987 [DE] Fed. Rep. of Germany ....... 3707915

[51] Int. Cl.$^4$ .......................... H04N 5/06; H04N 5/63
[52] U.S. Cl. .................................... 358/190; 358/150; 358/159
[58] Field of Search ............... 358/190, 148, 158, 159, 358/150, 188

[56] References Cited

U.S. PATENT DOCUMENTS

| | | | |
|---|---|---|---|
| 3,288,920 | 11/1966 | Baracket | 358/150 |
| 3,956,669 | 5/1976 | Del Ciello | 358/190 |
| 4,671,723 | 8/1988 | Lendaro | 358/190 |

Primary Examiner—Tommy P. Chin
Attorney, Agent, or Firm—Max Fogiel

[57] ABSTRACT

A television receiver with a utility line-separated end and a controlled, line-separating, switched external power supply at the utility line end. Horizontal and vertical deflection currents are generated by horizontal and vertical output stages, and each of the two output stages are connected to a driving stage for the purpose of triggering the respective output stage. A modulator supplies a triggering signal to the driving stage and controls line separation. A horizontal frequency control signal and a vertical frequency control signal are generated and applied to horizontal and vertical sawtooth signal generators. The vertical output stage has one input connected to the horizontal sawtooth signal generator, and a second input connected to the vertical sawtooth signal generator through an error amplifier for vertical deflection of the end of the power supply connected to the utility line. The power supply is synchronized with oscillators for horizontal and vertical deflection, and is connected at the utility line-separated end.

5 Claims, 1 Drawing Sheet

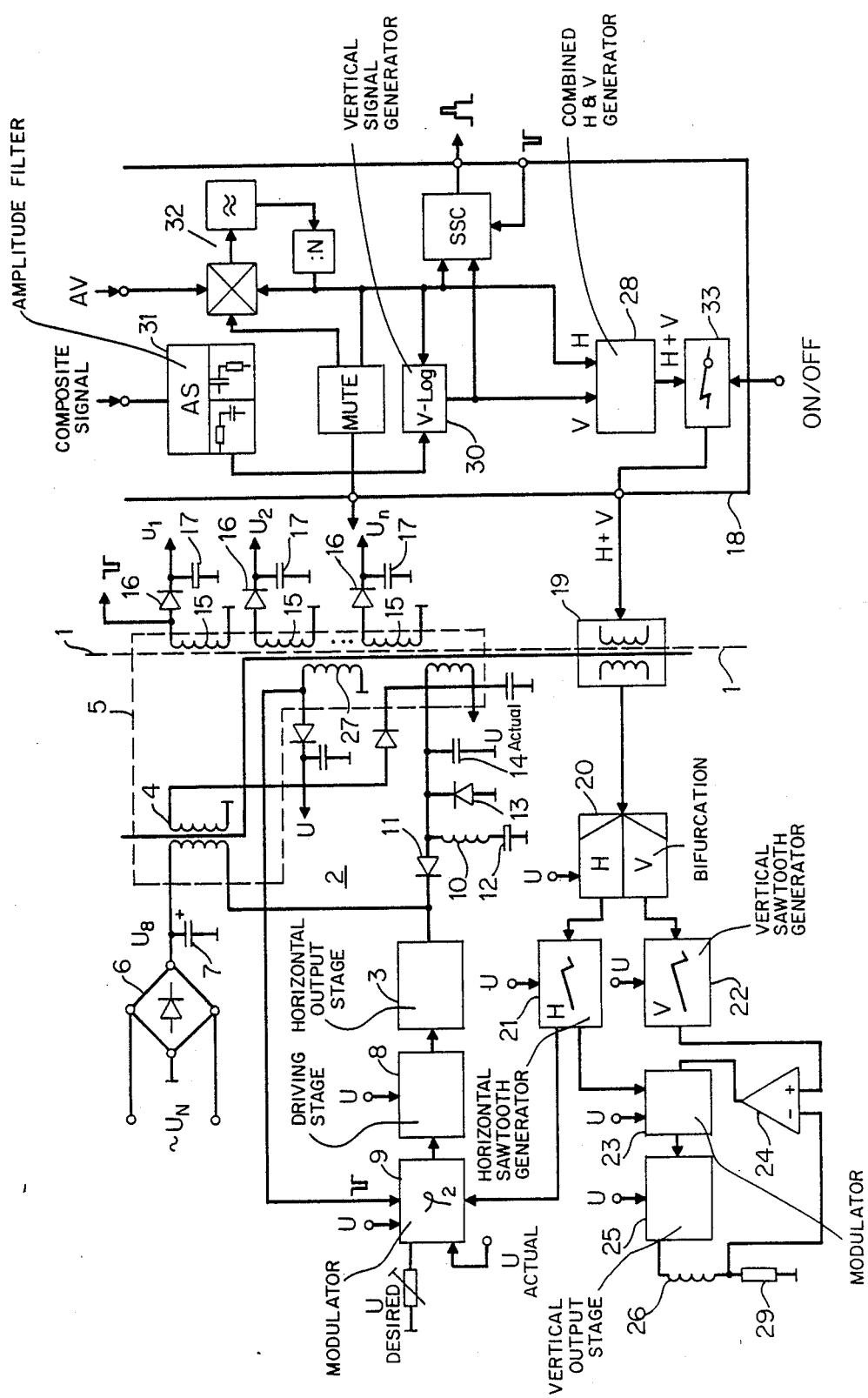

TELEVISION RECEIVER WITH A CONTROLLED, LINE-SEPARATING, SWITCHED EXTERNAL-POWER SUPPLY

BACKGROUND OF THE INVENTION

The invention concerns a television receiver with a controlled, line-separating, switched external-power supply.

The use of external-power supplies, especially switched external-power supplies, to separate the line in television receivers is known. A freely oscillating external-power supply that is controlled at the line end for example is known. External-power supplies of this type, however, entail disturbances in the form of unsynchronized strips in the picture on the television screen. These disturbances can only be eliminated by means of expensive measures, like filters for example. More practical are synchronized external-power supplies that lack the disturbances, whereby the horizontal and vertical deflection circuits are at the line-separated end. This approach requires a line-separating coupling element to bring the synchronization signals for the external-power supply to the end of the switched external-power supply that is connected to line. This design, however, demands two switches, one for deflection and one for the external-power supply.

Television receivers in which the horizontal-deflection circuit and the external-power circuit are combined into one component are also known. One such circuit, a Wessel circuit for example, has the advantage of requiring only one power transistor with a cooling plate and a drive circuit for both the external-power supply and horizontal deflection. If the vertical-deflection circuit is then left on the lineseparated end, line separation will operate through the deflection component that the horizontal-deflection coils at the line end and the vertical-deflection coils at theline-separated end are associated with. A system of this type, however, entails problems in complying with German Electrical-Engineering Society (VDE) regulations and is accordingly not simple to manufacture.

SUMMARY OF THE INVENTION

The object of the present invention is to provide a television receiver that is line-separated to the extent that it is cost-effective while still exploiting the advantages of for example a Wessel circuit. The object is attained in the invention recited in the major claim. The advantage of the invention is that, in spite of the low expenditure on components, the establishment of a special interface between the line end and the line-separated end allows any type of peripheral device to be attached. The expenditure on components more or less corresponds to that for television receivers that are not line-separated.

The invention will now be described with reference to the drawing.

BRIEF DESCRIPTION OFF THE DRAWING

A schematic view of the essential elements, according to the present invention.

DESCRIPTION OF THE PREFERRED EMBODIMENT

A line-separation interface 1 represents the galvanic separation of the modules that will now be described. At the line end is a combination external-power supply and horizontal-deflection circuit 2 that consists of an output stage 3 that periodically diverts to ground a direct-current voltage $U_B$ obtained by way of the winding 4 of a transformer 5 from an alternating-current line voltage $U_N$ and rectified at a filter capacitor 7 by means of a rectifier 6. Output stage 3 is triggered by a driving stage 8 that obtains a triggering signal from a modulator 9. The triggering signal is a pulse-width modulated signal that changes in accordance with the actual line voltage $U_{ist}$ and with the phase comparison $\Phi_2$ between the horizontal-flyback pulse and the horizontal sawtooth voltage. This occurs in modulator stage 9. Output stage 3 generates the horizontal-deflection current through a deflection coil 10 that is coupled to the output stage in a known way through a diode 11 and is connected to reference potential through a tangent capacitor 12. A flyback diode 13 and a flyback capacitor 14 are connected parallel to deflection coil 10 and tangent capacitor 12. External-power supply 2 acts like an external-power supply that is synchronized by the synchronization pulses of the FBAS television signal, supplying the operating voltages $U_1$ to $U_n$ required for the line-separated end of the television receiver through n secondary windings 15, and n rectifiers 16 to n capacitors 17. A horizontal- and vertical-frequency control signal H + V is obtained from a line-separating coupling circuit 19. The signal arrives through a bifurcation 20 with its horizontal portion at a horizontal-frequency sawtooth generator 21 and with its vertical portion at a vertical-frequency sawtooth generator 22. One output terminal of horizontal-frequency sawtooth generator 21 is connected to one input terminal of a pulse-width modulator 23, to the other input terminal of which the vertical-frequency sawtooth signals from vertical-frequency sawtooth generator 22 can be supplied when necessary through an amplifier 24. The pulses from pulse-width modulator 23 trigger a vertical-output stage 25 that supplies a vertical-deflection coil 26. An actual level that is proportional to the deflection current can be obtained from a test resistor 29 that is connected in series with the deflection coils and against the reference potential. The actual level is supplied to the inverting input terminal of error amplifier 24. The sawtooth signal from horizontal-frequency sawtooth generator 21 is supplied to modulator 9 along with the comparison pulse obtained from a winding 27 in transformer 5 to control the switch-off edge of the signal that triggers output stage 3. The switch-on edge is displaced in accordance with actual line voltage $U_{ist}$. The line-separation interface 1 in accordance with the invention makes very inexpensive line-separation possible. External-power supply horizontal stage 2 is synchronized by means of a circuit 18 that is synchronized by television signal FBAS and is located at the line-separated end of the television receiver. This circuit generates a combined control signal consisting of horizontal and vertical pulses H and V. The vertical signal is generated in a logic circuit 30 that receives both a vertical-frequency synchronization signal from an amplitude filter 31 and a horizontal-frequency synchronization signal from a PLL circuit 32. The combination horizontal-and-vertical signal is generated in a logical-connection circuit 28. It is, however, also possible to transmit these H + V signals separately by way of a line-separating coupling circuit. These signals can be discontinued by means of a switching stage 33 in order to turn the television receiver off in a simple way. The combined signal arrives by way of line-separating coupling circuit 19 at the primary end of the television receiver. Line-separating coupling circuit 19 can for example be either a translator or an optical-electronic component. A signal MUTE for mute-controlling the receiver and a super-sandcastle pulse SSC are, along with any other pulses, like key pulses to allow keypad control, that the television receiver may need are generated at the line-separated end. The interior circuitry of circuit 18 is essentially the same as a CSF TEA 2029 integrated circuit.

We claim:

1. A television receiver comprising a controlled switched external power supply separating circuits in said television receiver from a utility power supply line; said external power supply having a first part connected to said utility power supply line and a second part separated from said supply line; horizontal output stage for generating horizontal deflection current and a vertical output stage for generating vertical deflection current; a driving stage for each said output stage for triggering the output stages; modulator means for supplying a triggering signal to the driving stage for said horizontal output stage and controlling separation of said circuits; vertical and horizontal sawtooth signal generators; means for generating a horizontal frequency control signal and a vertical frequency control signal; means for supplying said horizontal frequency control signal to said horizontal sawtooth signal generator; means for supplying said vertical frequency control signal to said vertical sawtooth signal generator; said vertical output stage having one input connected to said horizontal sawtooth signal generator; said vertical output stage having a second input connected to said vertical sawtooth signal generator through an error amplifier for vertical deflection in said first part of said external power supply connected to said utility power supply line; means for synchronizing said external power supply in said second part of said external power supply.

2. A television receiver as defined in claim 1, including a line-separating coupling circuit in said means for generating a horizontal frequency control signal and a vertical frequency control signal, said horizontal sawtooth signal generator being triggered by said horizontal frequency control signal and said vertical sawtooth signal generator being triggered by said vertical frequency control signal, said horizontal frequency control signal and said vertical frequency control signal switching on said power supply, said line-separating coupling circuit transferring said horizontal frequency control signal and said vertical frequency control signal from said second part to said first part when said external power supply is switched on.

3. A television receiver as defined in claim 2 wherein said line-separating coupling circuit comprises a transfer circuit.

4. A television receiver as defined in claim 2, wherein said line-separating coupling circuit comprises optical-electronic means.

5. A television receiver end comprising a controlled switched external power supply separating circuits in said television receiver from a utility power supply line; said external power supply having a first part connected to said utility power supply line and a second part separated from said supply line; a horizontal output stage for generating horizontal deflection current and a vertical output stage for generating vertical deflection current; a driving stage for each said output stage for triggering the output stages; modulator means for supplying a triggering signal to the driving stage for said horizontal output stage and controlling separation of said circuits; vertical and horizontal sawtooth signal generators; means for generating a horizontal frequency control signal and a vertical frequency control signal; means for supplying said horizontal frequency control signal to said horizontal sawtooth signal generator; means for supplying said vertical frequency control signal to said vertical sawtooth signal generator; said vertical output stage having one input connected to said horizontal sawtooth signal generator; said vertical output stage having a second input connected to said vertical sawtooth signal generator through an error amplifier for vertical deflection of an end of said power supply connected to said utility power supply line; means for synchronizing said external power supply in said second part of said external power supply; a line-separating coupling circuit in said means for generating a horizontal frequency control signal and a vertical frequency control signal, said horizontal sawtooth signal generator being triggered by said horizontal frequency control signal and said vertical sawtooth signal generator being triggered by said vertical frequency control signal, said horizontal frequency control signal and said vertical frequency control signal switching on said power supply; said line-separating coupling circuit transferring said horizontal frequency control signal and said vertical frequency control signal from said second part to said first part when said external a power supply is switched on; said horizontal output stage being triggered by a pulse-width modulated signal varying with actual line voltage and with a phase comparison between a horizontal-flyback pulse and output from said horizontal sawtooth signal generator; said television receiver receiving a composite television signal having synchronization pulses, said power supply being synchronized by said synchronization pulses of said composite television signal; said vertical output stage including a pulse-width modulator for triggering said vertical output stage; deflection coil means connected to an output of said vertical output stage; test resistor means connected between said deflection coil means and a reference potential for providing an actual level proportional to deflection current in said deflection coil means, said actual level being supplied to a further input terminal of said error amplifier; said horizontal output stage being triggered by a signal having a switch-off edge; said horizontal sawtooth signal generator supplying a sawtooth signal to said pulse-width modulator together with a comparison pulse from said error amplifier to control said switch-off edge of said signal triggering said horizontal output stage; said means for supplying said vertical frequency control signal to said vertical sawtooth signal generator comprising means for receiving both a vertical frequency synchronization signal from an amplitude filter and a horizontal frequency synchronization signal from a PLL circuit.

* * * * *